J. S. CULP.
PRESSED STEEL VEHICLE WHEEL.
APPLICATION FILED OCT. 6, 1919.
1,375,900.
Patented Apr. 26, 1921.
3 SHEETS—SHEET 1.
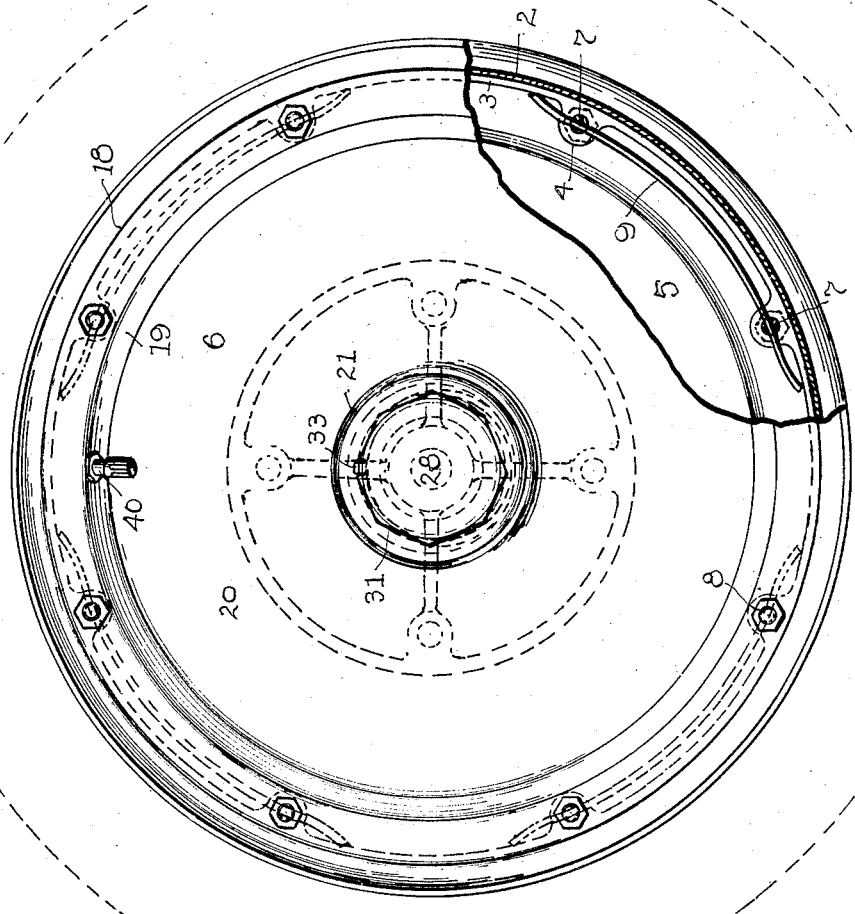
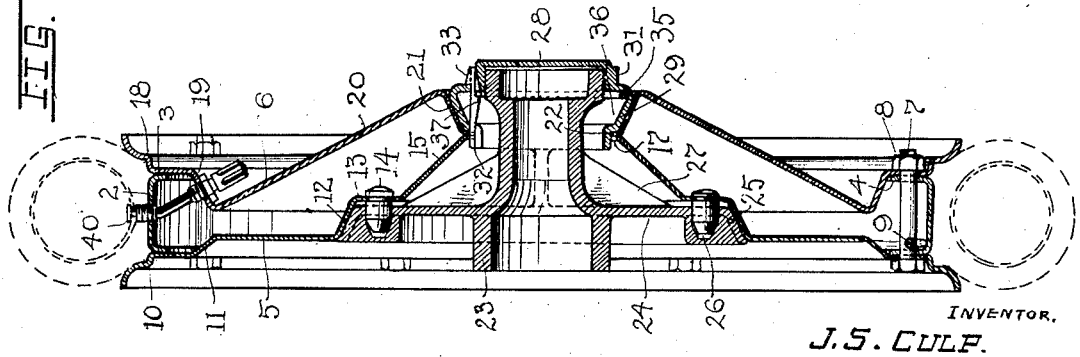

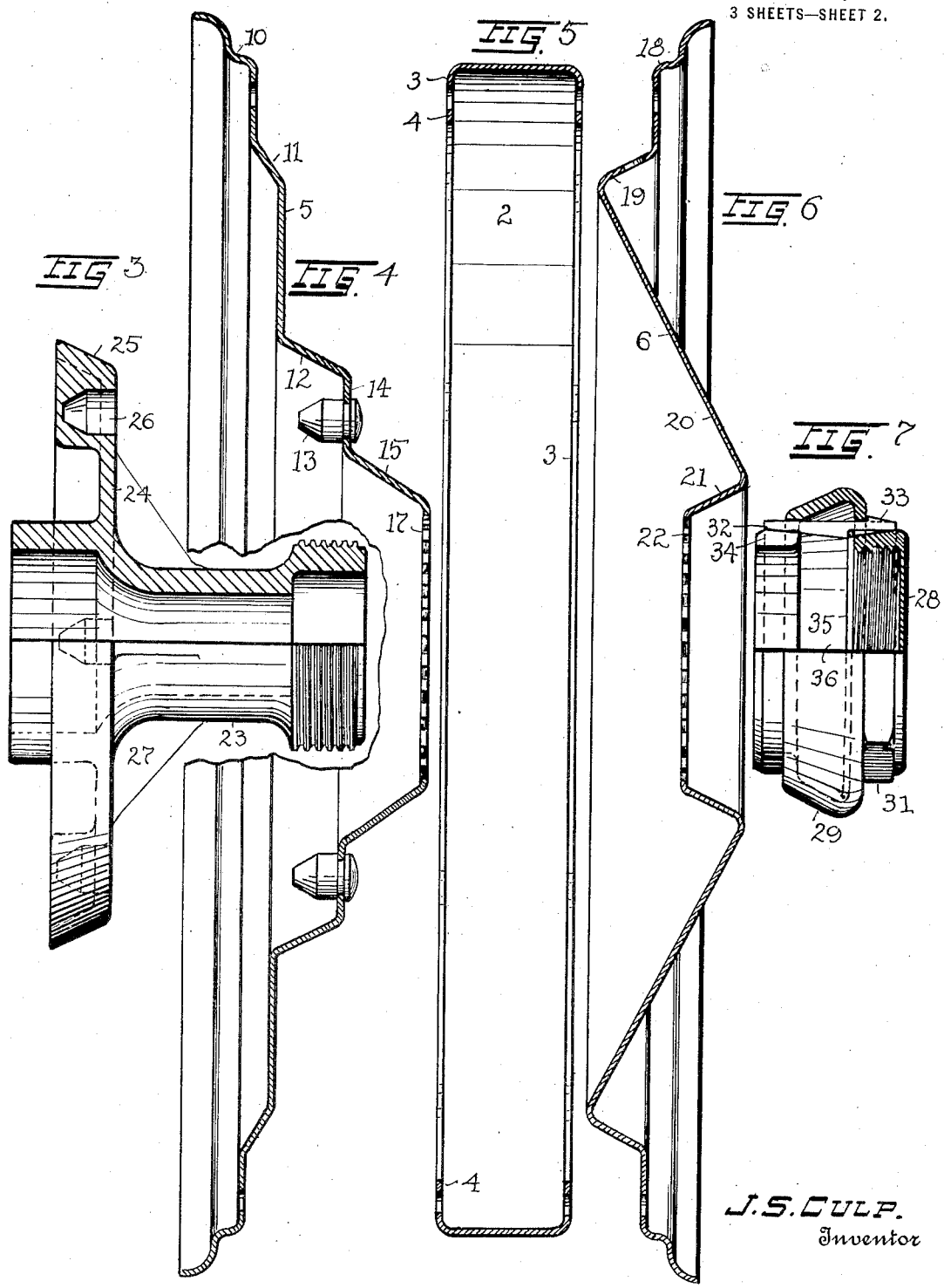

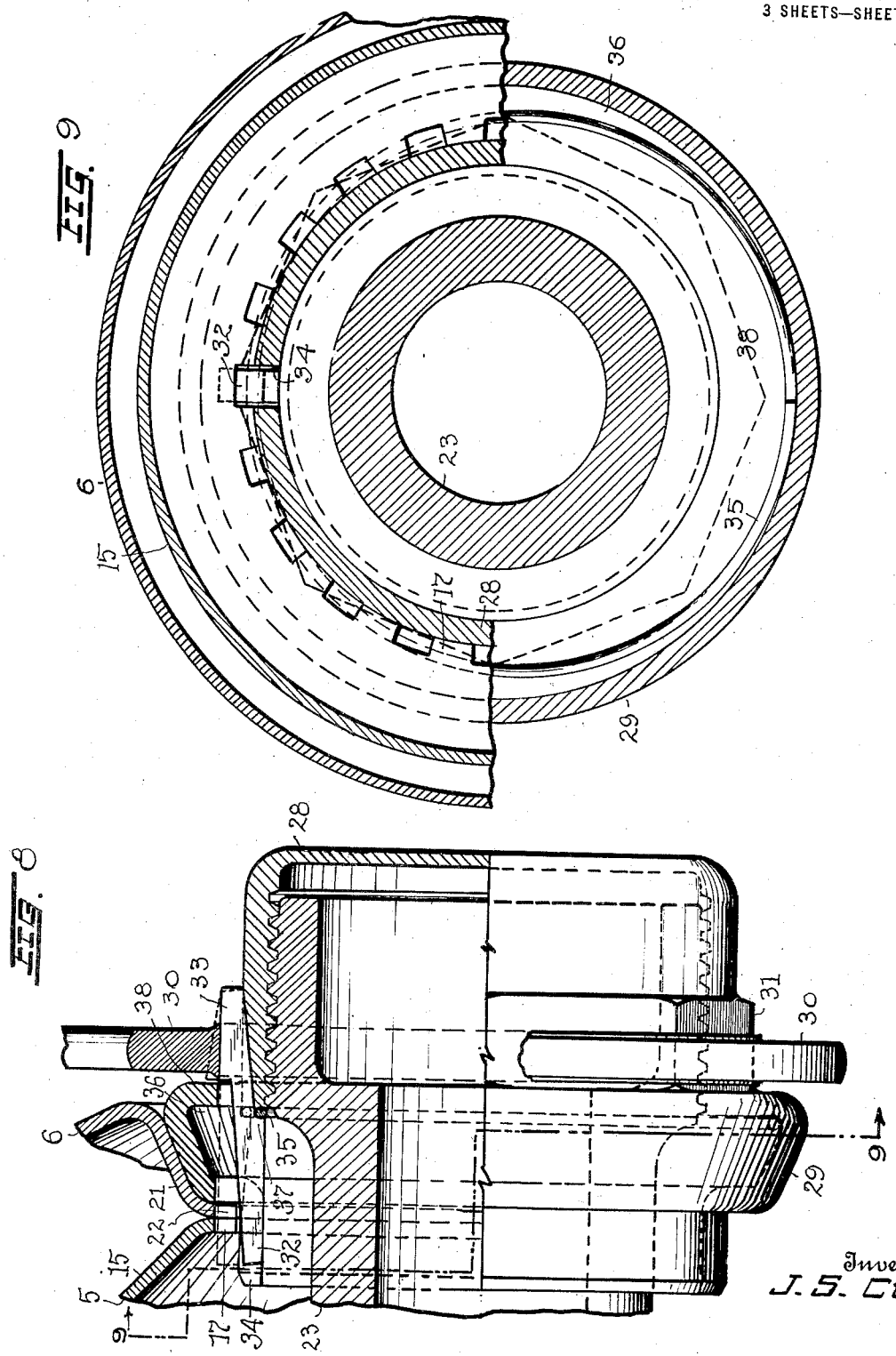

UNITED STATES PATENT OFFICE.

JAY STANLY CULP, OF CLEVELAND, OHIO, ASSIGNOR TO THE RELIANCE WHEEL CO., OF YOUNGSTOWN, OHIO, A CORPORATION OF OHIO.

PRESSED-STEEL VEHICLE-WHEEL.

1,375,900.                Specification of Letters Patent.        Patented Apr. 26, 1921.

Application filed October 6, 1919. Serial No. 328,670.

*To all whom it may concern:*

Be it known that I, JAY STANLY CULP, citizen of the United States, residing at Cleveland, in the county of Cuyahoga and State of Ohio, have invented certain new and useful Improvements in Pressed-Steel Vehicle-Wheels, of which the following is a specification.

This invention relates to a vehicle wheel having a main body made of sheet steel disks stamped or pressed into a particular form and adapted to be removably affixed upon a separate hub by a conical hub cap and a locking device, all substantially as hereinafter shown and described and more distinctly pointed out in the claims.

In the drawings accompanying this application, Figure 1 is a cross section of a vehicle wheel constructed according to my invention, and Fig. 2 is a side view of the wheel with a portion broken away to disclose one of the bolt locking wires. Fig. 3 is an enlarged side view partly in section of the separate wheel hub. Fig. 4 is a sectional view of the inner wheel disk, partly broken away at its center. Fig. 5 is a cross section of the annular rim for the wheel. Fig. 6 is a sectional view of the outer wheel disk. Fig. 7 is a side view, partly in section, of the hub cap. Fig. 8 is an enlarged side view, partly in section, of the hub cap, the hub extension, portions of the wheel disks, and a wrench in engaging position with the locking key. Fig. 9 is a sectional view of the assembled parts of Fig. 8 taken on the irregular line 9—9, of said figure.

The wheel comprises an endless ring 2 having narrow inwardly-turned flanges 3 and perforated ears 4 at opposite sides thereof. This ring is adapted to seat a pneumatic or other tire, and a pair of pressed steel plates or disks 5 and 6, respectively, hold the tire upon the ring, especially when these disks are clamped against the ears 4 by bolts 7 and removable nuts 8. The said bolts are each provided with a transverse opening relatively near their fixed heads, and separate locking wires 9 are inserted within the adjacent openings of successive pairs of bolts and the extremities of each wire bent toward the ring to prevent displacement of the wire. In this way all the bolts are locked in the ring and the ring also locked to the inner disk 5, but when nuts 8 are removed from the threaded ends of the bolt the outer disk 6 may be detached from the ring while the ring and inner disk and the bolts remain united together and can be handled without becoming separated. However, if necessary, the inner plate 5 and ring 2 can be separated also by withdrawing the locking wires 9 from the bolts.

The inner disk 5 is dished or stepped toward the front disk at successive distances from its outer curved edge, the first offset occurring at 10 opposite the ring 2 to provide a flat seating face for the ears 4, the second offset 11 being stepped in the same direction on sloping lines opposite the ears to stiffen the disk near the ring, the third offset extending still farther toward the front about midway between the periphery and axis of the wheel to provide a flaring or conical seat 12 terminating in a vertical wall 13 which is provided with a number of beveled studs or pins 14 spaced at equal distances apart and projecting toward the rear side of the disk, and the fourth offset being a truncated cone 15 projected toward the front side of the wheel and terminating in a short flange or shoulder having notches and teeth 17 arranged in a circle about a central opening in the disk.

The outer disk 6 is dished in part like the inner disk, that is it is offset at 18 to provide a flat bearing face for the ears 4 and also sloped inwardly at 19 before a further bend is produced. However, disk 6 differs from disk 5 in that its major central portion 20 is projected on straight tapering lines toward the outside and beyond the vertical plane of the curved rim portion of the disk where a reverse bend provides a flaring seat or conical portion 21 which is reversely related to seat 12 in disk 5. The immediate center of disk 6 is open and bordered by a narrow flange having notches and teeth 22 corresponding to the notches and teeth 17 in disk 5, and the said middle and smaller conical portions 15 and 21 of disks 5 and 6, respectively, are adapted to engage each other and together resist thrust and pressure centrally of the wheel. Further rigidity and strength is afforded when the two disks are mounted in place upon the separate hub 23.

This hub 23 is also made of metal, cast or forged, and is fashioned at its center in any suitable way to receive roller or ball bearings or to fit on an axle or spindle having a nut at its outer end whereby it may be fastened or held removably upon the axle or spindle. But regardless of its internal construction this hub is provided with an external flange 24 having a flaring or beveled circumferential portion 25 adapted to fit within the conical seat 12 of rear disk 5, and when so seated a series of openings 26 in the front face of flange 24 receive the studs or pins 14 which are riveted to the disk and whereby a driving connection is obtained between the disk and hub. Radial ribs 27 strengthen this flange and hub, and the enlarged front end of the hub is screw threaded externally.

An internally-threaded hub cap 28 is adapted to engage and inclose the front end of the hub, and this hub cap is enlarged and of conical form over a portion of its length midway between its open and closed ends. The conical part 29 is of a diameter adapted to fit snugly within the inwardly-extending flaring seat 21 of the front disk 6, and when the two disks are assembled and slipped together as a unit over hub 23 the rear disk 5 is wedged upon the flaring portion 25 of the hub and the front disk is adapted to be clamped against the rear disk and upon the front end of the hub by screwing the conical hub cap 28 to its limit within the flaring seat 21 in the front disk.

Rotation of the hub cap is accomplished by slipping a wrench 30 over the exposed wrench-engaging extremity 31 of the cap, and in order that the hub cap may be securely locked and prevented from turning and the clamped parts safe-guarded from jarring loose or moving independently, I have provided a locking key 32 having a shouldered and beveled short end 33 which projects through an opening in the cap and is exposed to view and extends at one side of the wrench-engaging extremity 31 of the hub cap. The main body of key 32 extends through the hollow central portion of the hub cap and out of a slot 34 at one side of the inner reduced end of the cap where said key is adapted to rest within any one of the notches and interlock any one of the notches and interlock with the teeth 17 and 23, on the two disks 5 and 6, respectively, when the hub cap enters the flaring seat 21 of the outer disk 6. However, engagement of the key with the teeth is avoided while the hub cap is being screwed upon or off of the hub because the wrench with which this work is done is then engaged with the beveled exposed end 33 and holds the key out of contact with the teeth as clearly shown in Fig. 8 where the locking end of the key is shown as pressed inward toward the axis of the hub and away from the teeth. In this position of parts a split ring 35 of spring wire is in a state of compression within the annular chamber 36 in the hub cap because this ring is directly engaged by the key behind a shoulder 37 therein opposite the vertical wall 38 of the cone. The moment the wrench is slipped free of the beveled end 33 of the key the wire spring expands and snaps the locking end of the key into a notch between the teeth, thereby locking the hub cap and the assembled disks from independent rotation. The wire ring is still under tension however so that it retains its seat within the hub cap and presses constantly against the key to prevent it from disengaging itself or from rattling, and the ends of the wire ring may either abut or overlap, provided the required spring action is obtained for the key. Inasmuch as an endless wire ring of the proper diameter would be difficult to insert into the circular chamber 36 of the cap, I prefer to use either a split ring or a section of a coil of spring wire which can be contracted and which will expand again to a predetermined diameter.

In use, the two disks and the tire and the tire supporting ring, are removable together from the hub subsequent to unscrewing the hub cap, while the hub remains on the axle or spindle. Then to remove the tire, the united disks are laid flat on the ground and the nuts 8 unscrewed from bolts 7 so that the outer disk 6 may be separated from the tire-seating ring. To facilitate inflation and deflation of the tire, a bent tire-valve 40 is used which extends through an opening in ring 2 and an opening in the sloping offset 19 of outer disk 6 where the outer end of the tire valve will be exposed and extend at an angle and be within convenient reach.

What I claim is:

1. A vehicle wheel, comprising a rear disk of pressed sheet metal having a central opening and an annular recessed seat about said opening, a front disk of pressed sheet metal having a central opening and an annular recessed seat therearound, a hub having a flange adapted to occupy the seat in the rear disk, means adapted to provide a separable driving connection between said hub and rear disk, and a removable cap for said hub adapted to occupy the seat within the front disk and clamp both disks upon the hub having a locking device adapted to interlock with the base portion of the annular seat within said front disk.

2. A vehicle wheel, comprising separate rear and front disks having central openings surrounded by conical portions, said disks being oppositely situated with their respective conical portions engaging each other, a hub adapted to extend through said openings in driving connection with one of said disks, and means detachably connected with said hub adapted to clamp both disks thereon.

3. A pressed steel vehicle wheel, comprising a dished rear disk having an open conical portion at its center surrounded by an annular depression and seat, a dished front disk having an open inwardly-extending conical seat at its center, a hub having an annular flange adapted to fit within the depression and seat of the rear hub, and a screw cap for said hub having a conical portion adapted to enter the seat in said front disk and clamp both disks upon the hub.

4. A pressed steel vehicle wheel, comprising a rear disk having a central conical extension surrounded by a flaring depression and seat, a front disk having a forwardly-extending body portion provided with an inwardly extending conical depression at its center, a hub having an annular flange adapted to fit within the depression and seat of said rear disk, and a hub cap of conical form adapted to seat within the conical depression in said front disk and clamp both disks upon the hub.

5. A vehicle wheel, comprising separate front and rear disks, the rear disk being stepped inwardly at intervals toward the front disk, and the front disk being stepped inwardly near its rim toward the rear disk, and thence outwardly on tapering lines toward the center of the disk and thence inwardly at its center on straight converging lines toward the inwardly-extending portion of the rear disk, a hub extending through both disks, and interlocked with the inwardly-extending portion of the rear disk, and a clamping member detachably connected with the front end of the hub and adapted to seat within the retired central portion of the front disk.

6. A vehicle wheel, comprising a tire-supporting ring, a rear disk and a front disk on opposite sides of said ring, said rear disk being stepped inwardly toward the front disk at successive intervals to provide a central conical bracing portion surrounded by an annular depression and flaring seat, and said front disk being dished inwardly opposite its rim and extending outwardly on tapering lines toward the center of the disk and thence projected inwardly on tapering lines to provide a conical depression at the front and center of the front disk and an inwardly extending bracing portion adapted to abut against the central portion of the rear disk.

7. A vehicle wheel, comprising a tire-seating ring, separate disks seated upon opposite sides of said ring, bolts and nuts adapted to unite said ring and bolt disks together, and supplemental means adapted to lock each bolt and the ring and one of said disks together.

8. A vehicle wheel, comprising a tire-seating ring, a rear disk and a front disk on opposite sides of said ring, bolts uniting said ring and disks together, and removable locking devices for the bolts adapted to prevent the ring and rear disk from separating upon removal of the front disk.

9. A vehicle wheel, comprising a tire-seating ring, a rear disk and a front disk in separable engagement with said ring, bolts adapted to unite said ring and disks together at spaced intervals, and locking wires connecting the adjacent bolts.

10. A vehicle wheel, comprising a tire-seating ring, a rear disk and a front disk, bolts and nuts uniting said disks and ring together having openings, and separate locking wires extending through the adjacent openings of successive bolts to secure the bolts and one of said disks to the ring.

11. A vehicle wheel, comprising a hub, a pair of disks having abutting central portions provided with openings surrounded by notches and teeth, and a hub cap adapted to clamp said disks together having a locking key adapted to interlock with the teeth on both disks.

Signed at Cleveland, in the county of Cuyahoga, and State of Ohio, this 23d day of September, 1919.

JAY STANLY CULP.